428-919 SR
6/29/76 XR 3,967,026

United States Patent [19]
Dalblom

[11] 3,967,026
[45] June 29, 1976

[54] CAMOUFLAGE SHEET AND METHOD FOR MANUFACTURING THE SAME

[75] Inventor: Gunnar Dalblom, Solna, Sweden

[73] Assignee: Barracudaverken Aktiebolag, Gamleby, Sweden

[22] Filed: Oct. 25, 1974

[21] Appl. No.: 518,206

[30] Foreign Application Priority Data

Nov. 1, 1973 Sweden .............................. 7314888

[52] U.S. Cl. .............................. 428/195; 135/5 R; 428/919

[51] Int. Cl.[2] ........................ B32B 3/00; E04F 10/00

[58] Field of Search ............. 428/919, 17, 195, 136; 135/5 R; 161/89; 117/37 R; 89/36 D, 36 E; 40/106.51; 35/27; 283/819

[56] References Cited

UNITED STATES PATENTS 3,069,796 12/1962 Roter .................................. 428/17

FOREIGN PATENTS OR APPLICATIONS 1,204,343 1/1960 France
1,335,945 7/1963 France
556,235 8/1932 Germany
909,667 5/1954 Germany
1,187,525 1965 Germany ............................ 428/132
340,517 1930 United Kingdom ................ 428/919

OTHER PUBLICATIONS

"Experiments in Visual Texture of Perception", Scientific American, Vol. 232, No. 4, Issue of Apr. 1975 pp. 34–43.

*Primary Examiner*—Marion E. McCamish
*Assistant Examiner*—Paul J. Thibodeau
*Attorney, Agent, or Firm*—Pierce, Scheffler & Parker

[57] ABSTRACT

When manufacturing camouflage sheets of substantial size, the camouflage pattern is normally printed or punched in repetitive consecutive steps so that a pattern repeat may be seen and impairs the camouflaging effect. The invention makes it possible to considerably increase the pattern repeat, i.e., the distance after which the pattern repeats itself on the sheet without increasing the size of the pattern, in that the sheet and the tool such as a printing plate are angularly displaced relative to one another in their own plane so that the pattern is repeated a number of times on the sheet such that adjacent areas of pattern are angularly displaced (turned) relative to one another. Thus, the pattern of each such area is in another angular position than the identical preceding pattern and the identical subsequent pattern.

11 Claims, 7 Drawing Figures

CAMOUFLAGE SHEET AND METHOD FOR MANUFACTURING THE SAME

"Camouflage sheet" below is intended to mean all camouflaging foils, nets, sheets, plates, sheet- and plate-shaped material, which can be elastic, hard, pliable, stiff etc. "Pattern template" below is intended to designate the effective pattern-forming printing surface of a tool which effects the camouflage pattern, for example a common flat or cylindrical printing plate, a silk screen, punching means etc. Camouflage sheets, with relatively few exceptions for special purposes, are furnished with a visible patterning in the form of irregular elements having different colours, coefficients of reflectivity (brightness) and/or are perforated. Especially for large sheets several square meters in area the problem often arises that the pattern repeats itself on one and the same sheet, as it is expensive or unfeasible to employ a press roll, printing plate, punching means and the like having the same effective area as the area of the sheet. The so-called pattern repeat, i.e., the distance after which the pattern repeats itself, should preferably be several meters, and to this end a pattern template is required which has an effective pattern-forming area (print or punch pattern surface) of about 10 $m^2$. In addition, for rotary printing of the pattern, the circumference of the press roll is determined by the pattern repeat R, for which reason the diameter of the roller must be about 32% of the pattern repeat.

The present invention comprises a camouflage sheet or slab whose pattern is permanently composed of several similar pattern elements, each one occupying an intended "zone" on the sheet or slab in direct connection with one or more such zones, so that the pattern elements repeat themselves on the sheet and the entire pattern occupies more than one such zone on the sheet, characterized in that the zones have one form of a 3-, 4-, 6- or 8-sided figure with such mutual angular displacement in at least the majority of such zones that pattern image repeating itself in two successive zones has dissimilar angular position in the two zones with a disparity in angular position of at least 45° and at most 315°.

With the invention according to the main and generic claims it becomes possible to at least double the repeat pattern, and through additional development according to directly following claim 2 and claim 7, respectively, the pattern repeat becomes four times as large as the side length of the pattern template. Through further development of the invention a pattern repeat can be effected which is eight times as large as to date.

FIG. 1 in the drawings is a diagram which is related to a camouflage sheet and shows planned square zones, where each individual zone corresponds to the effective area of a pattern template.

First, it is assumed that the camouflage pattern is printed with a square printing plate, e.g., silk screen printing. A sheet, which by this means is to be furnished with camouflage patterns, is assumed to resemble a chess board divided into equally large, planned square zones according to FIG. 1, each having the same dimension as the square effective area of the printing plate. The length L and width B of the zones are thus equal. By means of the printing plate the pattern is printed for example first in zone 1, upper left in FIG. 1. Thereafter the printing plate is turned 90° in its own plane, and zone 2, nearest to the right (or immediately below) said zone 1, is printed so that the printed pattern is angularly displaced 90°. The printing plate is then turned an additional 90° and the nearest following zone 3 is printed etc. The zone numbering 1–4 is thus related to that of the printing plate and the angular position of the thereby printed pattern in its own plane, namely, 0°, 90°, 180° and 270°. The turning can of course be carried out in the opposite direction, i.e. with negative angular values.

Instead of a printing plate, it is possible to employ a punching plate having many punching dies, so arranged that the punch groups in the sheet form the pattern. Punch patterns and colour patterns can be combined with one another on one and the same sheet. The term colour patterns is even related to single-coloured patterns having different gradations (darkness) for different elements within a zone.

Figure 1:
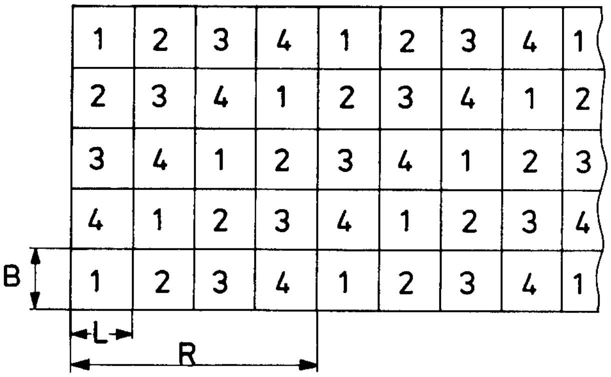
Figure 2:
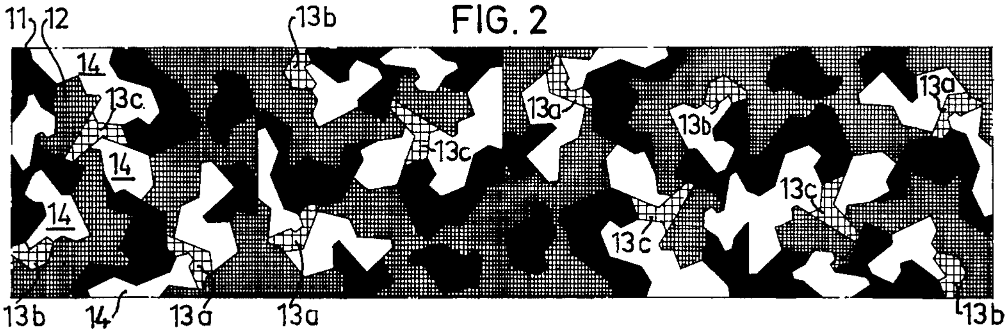
FIG. 2 shows a portion of one such camouflage sheet having a pattern in colour printing, said portion embracing four zones in a row according to FIG. 1.
Figure 3:
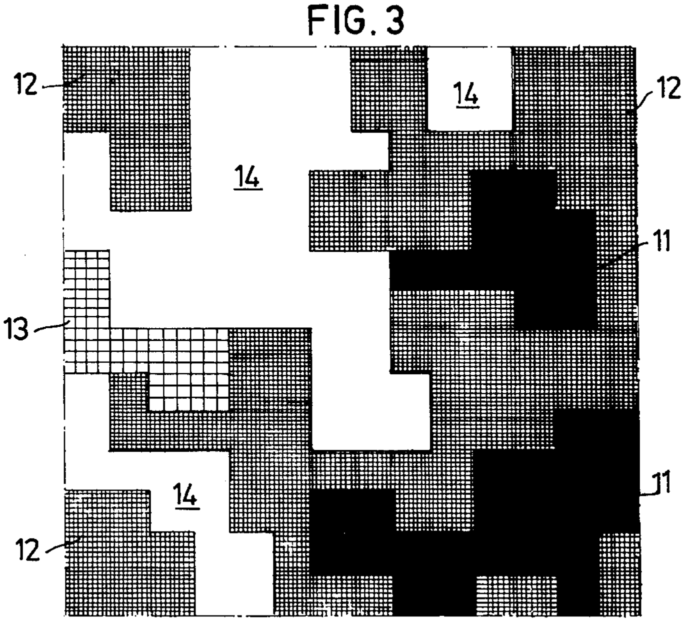
FIG. 3 shows a single zone having a camouflage pattern other than the one in FIG. 2.

FIG. 2 shows a portion of a camouflage sheet, said portion comprising four zones 1–4 per row according to FIG. 1, and FIG. 3 shows a single such zone furnished with a pattern intended essentially for special purposes. The darkest elements, black by way of example, are designated 11. In addition, there are elements which are less dark, for example brown elements 12, elements 13 and 14 deviating herefrom, for example dark green elements 13 and light green elements 14. Other colouration and combinations can also be selected according to known rules of practice. If FIG. 2 is seen as a whole it can be seen that the pattern is not experienced as one pattern repeated four times, but rather as a single pattern over all four zones 1–4. In order to clarify the relative turning of the pattern image in the four zones, corresponding elements having the same colour tone have been designated **13*a*, 13*b* and 13*c***, so that the different position of the three elements in the four zones can be seen; though the shapes and relative locations of all of these elements is the same in all the zones.

Alternatively, the sheet can be mono-coloured if it is assumed to be very light, e.g., sand yellow, light green or white (for winter camouflage), whereby the darkest elements 11 are formed by punch groups with large and/or dense holes in the sheet. For the lighter elements 12–14 the hole size and density can be less to a corresponding degree so that the elements 14 appear lightest. If the sheet is very dark, e.g. dark gray or dark brown, the lightness effect is reversed, "negative", and thus the same sheet can normally be used for camouflaging light, dark and half-dark objects, etc.

FIG. 2 can be somewhat misleading to the extent that it appears that one can see portions of the seams between the four zones. In practice this impression disappears if the pattern is not especially unfavourable in this respect or if each zone is relatively finely patterned with numerous elements 11–14. In addition, the pattern can be selected so that partial or total pattern matching is obtained between the zones in every one of the four possible relative pattern positions. Such pattern matching need not be at all precise, especially if the pattern, per se, as in FIG. 2, has many straight lines and discontinuities. It should also be pointed out that the edges of the zones need not be straight, but rather can be toothed, wavy or the like in such a way, preferably irregularly, that the edge of each zone is in total engagement with the corresponding boundary edge of the next zone, independent of the four dissimilar positions of the zones.

According to purpose and conditions, the sheet according to the invention need not have patterning in such a way that both rows and columns are obtained, as in FIG. 1. A sheet which does not need to be especially wide can easily comprise only a single row (or column) of zones under the condition that there is at least one zone seam and preferably two zone seams in the planned zone pattern on the sheet, i.e., at least one or two boundaries, respectively, between adjacent zones.

A sheet according to the invention need not be manufactured by the above method by means of a relative turning between the pattern template (printing plate, punching means or the like) and the sheet. Alternatively, several separate small sheets can be printed or punched, all having the same pattern, and then joining the zones after turning in their own planes so that a sheet composed of several zones is obtained in this way. Such separate square sheet portions need not even by joined, but can instead be attached to a common underlayer, for example a support net, with said angular displacement in multiples of 90°. In practice it is particularly advantageous to manufacture a sheet strip corresponding to a single row (or column) of zones and to then join two or more such strips so that the finished sheet then comprises two or more parallel rows of zones. Optionally, it is also possible to print or punch two or four zones in the form of half square- or square-forming sheet portions by said turning (angular displacement) and then joining together such sheet portions to form a whole sheet.

In a sheet according to FIGS. 1 and 2, said pattern repeat R is equal to four times the width (= the length) of each individual zone. The area pattern repeat, namely the repetition distance for the area which is formed by the square zone block, for example upper left, which consists of the zones 1,2,3,4 times zones 1,2,3,4 in this order, is however clearly equal to 16 times the area of a single zone and thereby 16 times the area of the pattern template and can be made even larger by providing the succeeding pattern block of 16 zones with a pattern sequence other than a direct copy of the first zone block, under the condition, of course, that the width and length of the sheet are equal to at least four times the side length B = L of each zone, 1–1.5 m by way of example.

Furthermore, it should be pointed out that it is obviously not necessary that the angular displacement between successive zones is 90° corresponding to the progression 1 = 0°, 2 = 90°, 3 = 180° and 4 = 270° in relation to starting position 1. The progression can for example be 0°, 180°, 90°, 270° corresponding to a turning of 0° for the first zone, 180° for the second zone, thereafter turning back −90° before the thrd zone is prepared and from this position +180° (thus to the position 270°) before the fourth zone is prepared.

The invention is not limited to square zones according to FIGS. 1–3, although these ought to be decidedly optimal if particular circumstances do not dictate otherwise. It can generally be said that the invention is employable for "zones" which have the form of preferably equilateral triangles, squares, rectangles, trapezoids, parallelepipeds or equiangular hexagons or octagons, in which at least one or two pairs of opposite parallel sides are mutually equally long but of a length unequal to the remaining sides. It should suffice to deal only briefly with the above special cases.

Figure 4:
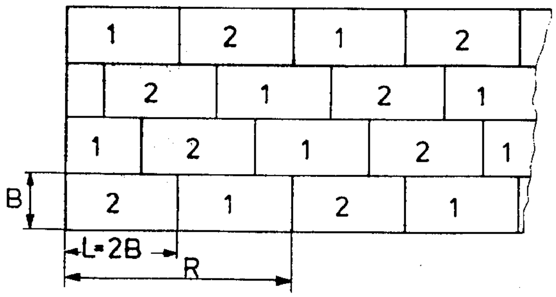
FIGS. 4, 5 and 6 are diagrams similar to FIG. 1 but having zones in the form of rectangles, equilateral triangles and equilateral equiangular hexagons.

FIG. 4 shows a sheet on which the repeated pattern image has pronounced rectangular form, in which successive zones 1 and 2 concern mutual pattern image turning of 180°. The zones in the various rows are, in addition, laterally displaced in relation to one another. The zones have a width B and a length L = 2B. Clearly the pattern repeat is R = 2L = 4B, i.e., only half of that with a patterning according to FIGS. 1 and 2. In spite of the poorer pattern repeat, such rectangular zones can be chosen on technical manufacturing grounds or for other practical reasons, for example if a manufacturing program comprises manufacture of rectangular sheets in any case, with a patterning which does not repeat itself and if several such sheets are to be joined to an appreciably larger sheet. In the diagram shown in FIG. 4 the mutual angular displacement between two successive zones in the row is always 180°. It is, however, possible to employ a zone configuration of the type known from parquetry and bricklaying where 90° displacement is found.

Figure 5:
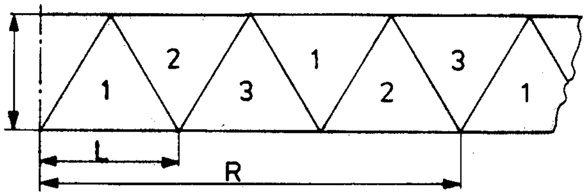

FIG. 5 shows a sheet with triangular zones, here shown as equilateral, but this need not be the case. Right triangles would, however, be less favourable than non-right triangles. The pattern turning is 120° for each zone and the pattern repeat is R = 3L. Several sheets according to FIG. 5 can clearly be joined quite simply to form a sheet having a width of 2B or a greater multiple of B.

Figure 6A:
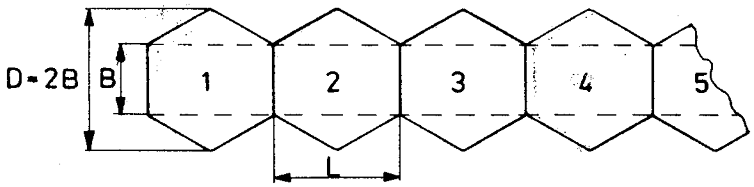
Figure 6B:
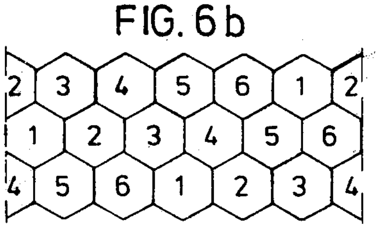

FIG. 6*a* shows the conditions for use of zones in the form of equilateral, equiangular hexagons. If a single row of zones is employed, i.e., a sheet strip having a width B according to FIG. 6*a*, and if it is assumed that the camouflage is printed with a printing plate, then the angular displacement between successive zones is 60° and the pattern repeat R = 6L; i.e., very high. On the other hand the printing plate is unnecessarily large and must print in "blank space" (blind print) outside of the sheet strip, i.e. outside of B in FIG. *6a*. This areal loss is 33%. For a sheet with several zone rows, however, this loss is fairly insignificant, and the pattern repeat, like the previously mentioned area pattern repeat, is very large. In both cases this implies that it is possible to accept a smaller pattern image (smaller zone and smaller printing plate) and a smaller turning (60° instead of 90° according to FIGS. 1–2), for which reason said disadvantage is possibly outweighed by the advantages. The hexagons need not be both equilateral and equiangular, but can be only equiangular with two pairs of parallel sides of the same length and the third pair sides with another length, i.e., a type of biased drawn apart hexagons, which, therefore, with wholly closing joining, form straight columns with zigzag rows (or vice versa).

What was mentioned above for hexagons applies finally also for octagons, where the areal loss from "blind" printing can be kept small and the pattern repeat is increased to 8L if L is the key dimension of the octagon. The required relative angular displacement or turning between successive zones is 45°. Octagons cannot be joined without empty interspaces into a multi row field in the same way as at least said 3-, 4- and 6-sided figures and can therefore, in general, only be employed for single row printing in the way shown in FIGS. 2 and 5, i.e., with ineffective area outside of the sheet strip, while the effective area is equal to $0.828L^2$, where L is again the key dimension in the case of equilateral equiangular octagons.

The zones can optionally have the form of a trapezoid or four-side parallelepiped, for example a rhombus, but such shapes should normally be of highly limited interest since, for various reasons, square zones are to be preferred as long as no special conditions exist.

What is mentioned in detail above concerning the embodiments according to FIGS. 1–3 applies also, where applicable, to other zone shapes, e.g., as to edge shape, pattern matching and the condition that it is not necessary to employ relative angular displacement between sheet and pattern template (printing plate, punching means or the like); rather the sheet can be composed of separate zones, optionally pairs of zones or blocks of zones having said mutual angular displacement.

For the sake of completeness it should be pointed out that the turning need not always be carried out in the plane of the zone and the sheet. In cases where the camouflage pattern is effected by punching and/or by furnishing both sides of the sheet with such a pattern (whereby the sheet can be partially transparent), the increase of the pattern repeat intended by the invention can also be achieved by turning certain zones over, i.e., by rotating the pattern element or the hereby furnished zone-forming sheet portion 180° around an axis lying in the plane of the zone.

Two different types of pattern formers can optionally be employed and/or two different types of zone shapes (for example square and rectangular) by turns.

What I claim is:

1. A method of manufacturing a camouflage sheet bearing an overall camouflage pattern composed of a plurality of contiguous component patterns having the general outline of a 3-, 4-, 6-, or 8-sided figure and each coextensive with a respective zone of the sheet, wherein the individual component patterns present the same irregular pattern features and the overall pattern is built up by separately applying the pattern features to the respective zones of the sheet and arranging for the pattern features of at least the majority of adjacent pairs of component patterns to be angularly offset relatively to one another by at least 45° and at most 315°.

2. The method of claim 1, wherein the pattern element and the zones appurtenant thereto are square, immediately successive pattern elements being angularly displaced in relation to one another by 90° or a multiple thereof.

3. The method of claim 1, wherein the element intended for each zone has such patterning that at least a partial pattern match is effected between pattern elements occupying immediately successive zones.

4. The method of claim 1, characterized in that every one of the several sheet portions is executed in the same shape as the zones and is furnished with its similar pattern element each and that these separate sheet portions are joined together and/or attached to a common under layer very close to one another with said mutual angular displacement to form the sheet thus composed of these sheet portions and, optionally, the underlayer.

5. The method of claim 1, wherein the edges of the pattern elements are non-linear and have such shape that edge-matching is obtained between any of two successive zones, independent of their said mutual angular displacement.

6. The method of claim 1, characterized by the steps of applying the pattern by means of a pattern template, and turning the pattern template and the sheet relative to one another after a zone is furnished with its pattern element and before the next zone is furnished with the same pattern element.

7. A camouflage sheet or slab whose pattern is permanently composed of several individual pattern elements having the same irregular pattern features: each pattern element occupying an intended "zone" on the sheet in direct connection with at least one more such zone, so that the pattern elements repeat themselves on the sheet and the entire pattern occupies more than one such zone on the sheet, characterized in that in each sheet the individual zone has the form of a regular goemetric figure having 3-, 4-, 6, or 8 sides with such mutual angular displacement of pattern element in at least the majority of such zones that the pattern element repeat in any two successive zones has dissimilar angular position with a disparity in angular position of at least 45° and at most 315°.

8. The sheet of claim 7, wherein the zones are square and said angular position disparity is between 90°, and 270° in the case of at least the majority of the zones.

9. The sheet of claim 7, wherein the pattern element intended for each zone is so embodied that at least a partial pattern matching is obtained between immediately successive zones.

10. The sheet of claim 7, wherein the zones are rectangles, and in at least the majority of successive zones, the zones show a mutual angular displacement of 180°.

11. The sheet defined in claim 7, wherein the edges of the zones and of the pattern elements therein are non-linear and completely match each other in the seams between any two successive zones.

* * * * *